United States Patent [19]

Fondeur

[11] Patent Number: 5,205,593
[45] Date of Patent: Apr. 27, 1993

[54] METHOD OF TIGHT CONNECTION, AND CORRESPONDING TIGHT CONNECTION FITTING

[76] Inventor: Francois Fondeur, 78 rue du Chevalier Francais, 59800 Lille, France

[21] Appl. No.: 739,095

[22] Filed: Aug. 1, 1991

[30] Foreign Application Priority Data

Aug. 3, 1990 [FR] France ............................ 90 10091

[51] Int. Cl.$^5$ ............................................. F16L 41/00
[52] U.S. Cl. ................................... 285/222; 285/158; 285/214; 285/397; 29/890.148; 29/523
[58] Field of Search ................ 403/248; 165/171, 172; 285/214, 222, 397, 208, 197, 158; 29/523, 890.148

[56] References Cited

U.S. PATENT DOCUMENTS

| | | | |
|---|---|---|---|
| 3,073,627 | 1/1963 | Ritter | 285/222 |
| 3,648,768 | 3/1972 | Schöll | 165/171 |
| 3,989,282 | 11/1976 | Zimmerman | 285/222 |
| 4,018,459 | 4/1977 | Mominee et al. | 285/208 |
| 4,349,070 | 9/1982 | Zinn et al. | 285/214 |
| 4,480,856 | 11/1984 | Costa | 285/397 |
| 4,508,321 | 4/1985 | Morimoto | 403/248 |
| 5,050,912 | 9/1991 | Hayasaka | 285/222 |

FOREIGN PATENT DOCUMENTS 826246 12/1951 Fed. Rep. of Germany ...... 285/222

Primary Examiner—Eric K. Nicholson
Attorney, Agent, or Firm—Ladas & Parry

[57] ABSTRACT

The tight connection fitting for a circular orifice in a rigid element is composed of a pipe in flexible material, such as rubber, whose external diameter is slightly greater than the bore of the orifice, and of a truncated cone-shaped bushing whose angle of conicity is less than the angle of friction between the two materials constituting the bushing and the pipe, and whose diameter at the base of the cone is substantially equal to the internal diameter of the pipe.

The angle of conicity is, for a bushing in polyamide and a pipe in rubber, at the most 20°, and preferably between 2° and 10°.

The bushing is introduced into the pipe so that the head of the bushing is at a certain distance from the end of the pipe; that end of the pipe is introduced by force into the orifice, and then the bushing is caused to slide inside the pipe until it is blocked in.

7 Claims, 2 Drawing Sheets

METHOD OF TIGHT CONNECTION, AND CORRESPONDING TIGHT CONNECTION FITTING

FIELD OF THE INVENTION

The present invention relates to a method of tight connection between two elements, one of which is in a rigid material and comprises a circular orifice, notably for fixing a pipe in the wall of a storage reservoir or for fixing a rubber pipe on a fluid distribution tube, or for fixing a system of rubber pipes on a collector tank. The invention also relates to a tight connection fitting, especially adapted for carrying out said connection method.

BACKGROUND OF THE INVENTION

There are two possibilities for fixing a pipe, particularly a rubber pipe, for example in the wall of a liquid storage reservoir, and obtaining a tight connection. The first one consists in using a member which will be mechanically and rigidly fixed to the wall, for example by screwing, and which will also serve as a pipe connecting endpiece. This first solution requires that the wall be so provided that the fixing operation is carried out in good conditions: tightness is not always perfect.

The second possibility consists in using the rubber pipe as a tightness element in combination with a hollow cylindrical bushing: the bushing is placed inside the pipe, it has a diameter such that the pipe is compressed at the level of the circular orifice, between the rigid wall and the bushing. This second solution is very easy to implement; however, with use, it develops certain disadvantages, due in particular to the diameter of the pipe varying from one manufacture to another; or to diameter irregularities occurring in a pipe during its manufacture. Indeed, for an orifice of set diameter, the fitting is composed of a cylindrical bushing of set external diameter and of a pipe of set internal diameter. Any deviation from these various diameters will entail inaccuracies in the positioning of the fitting which may cause poor tightness or incorrect mounting of the fitting. Another disadvantage resides in the necessity of having a high number of bushing assemblies, or else of having to alter the diameter of the orifice in order to adapt it to the available bushing assembly.

SUMMARY OF THE INVENTION

It is the object of the present invention to provide a connection method presenting the same advantages of simplicity as said second possibility, while eliminating the observed disadvantages.

This object is reached with a method of tight connection, according to the invention, between a first rigid element provided with a circular orifice and a second element. In characteristic manner, the method consists in:

a) introducing inside a pipe in flexible material, whose external diameter is slightly longer than the bore of the orifice, a truncated cone-shaped bushing whose angle of conicity is less than the angle of friction between the materials constituting the bushing and the pipe, respectively, such that the head of the bushing is at a certain distance from one given end of the pipe;

b) force-introducing said end of the pipe into the orifice; and c) causing the bushing to slide inside the pipe until the pipe is completely blocked between the bushing and the wall of the orifice.

Contrary to what might have been expected, the bushing has no tendency to slip out of the orifice despite its truncated cone shape. The fitting is fixed permanently and such slipping out is not found to occur as long as the condition relative to the angle of conicity is met. Thus, the special shape of the bushing compensates for any variations in the diameter of the pipes and makes it possible for the same bushing to be used for orifices of different-sized bores.

According to a first variant of the method, the second element to be connected may consist in the actual flexible pipe.

According to a second variant, the flexible pipe has a length smaller than that of the bushing and the second element is connected on the end of the bushing which corresponds to the base of the cone. In this latter case, the flexible pipe only serves as a tightness means.

It is another object of the invention to provide a tight connection fitting specially designed for implementing said method. Said tight connection fitting for a circular orifice in a rigid element is composed of:

a) a pipe in flexible material whose external diameter is slightly greater than the bore of the orifice, and b) of a truncated cone-shaped bushing whose angle of conicity is less than the angle of friction between the materials constituting the bushing and the pipe, and whose diameter at the base of the cone is substantially equal to the internal diameter of the pipe.

The bushing being in polyamide and the pipe in rubber, the angle of conicity of the bushing is at the most 20°, and preferably between 2° and 10°.

Advantageously, the bushing is provided at its base with an annular flange, which acts as a bearing surface for said bushing when the latter slides into the pipe, and which also prevents the inner face of the pipe from possible damage.

Preferably, the external diameter of the pipe is 2 to 4% greater than the bore of the circular orifice of the element to be connected.

BRIEF DESCRIPTION OF THE DRAWINGS

The invention will be more readily understood on reading the following description of the preferred embodiment of the tight fitting with truncated cone-shaped bushing and of its method of use, given with reference to FIG. 1 which shows a diagrammatical cross-section of the fitting mounted in a wall.

DETAILED DESCRIPTION OF PREFERRED EMBODIMENT

Figure 1:
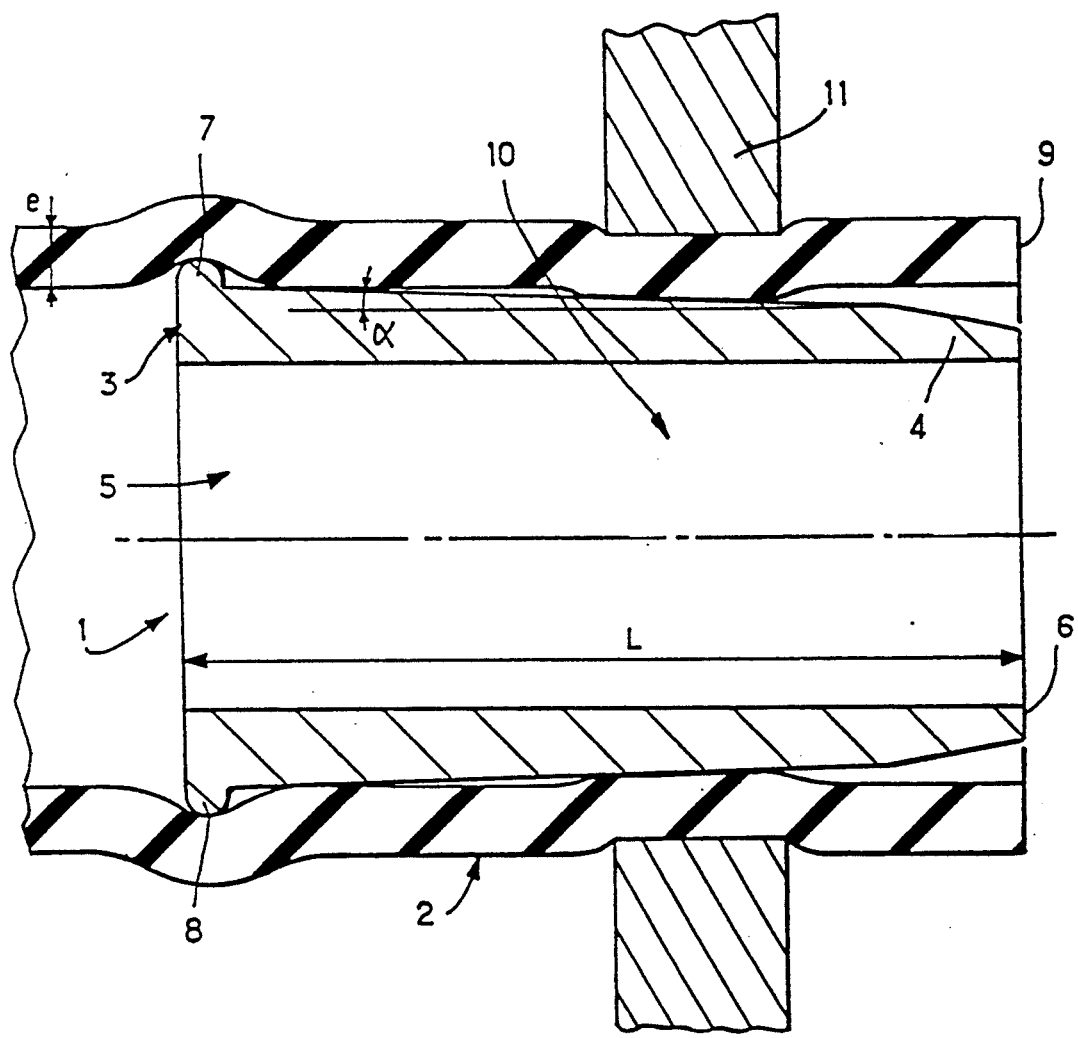
Figure 2:
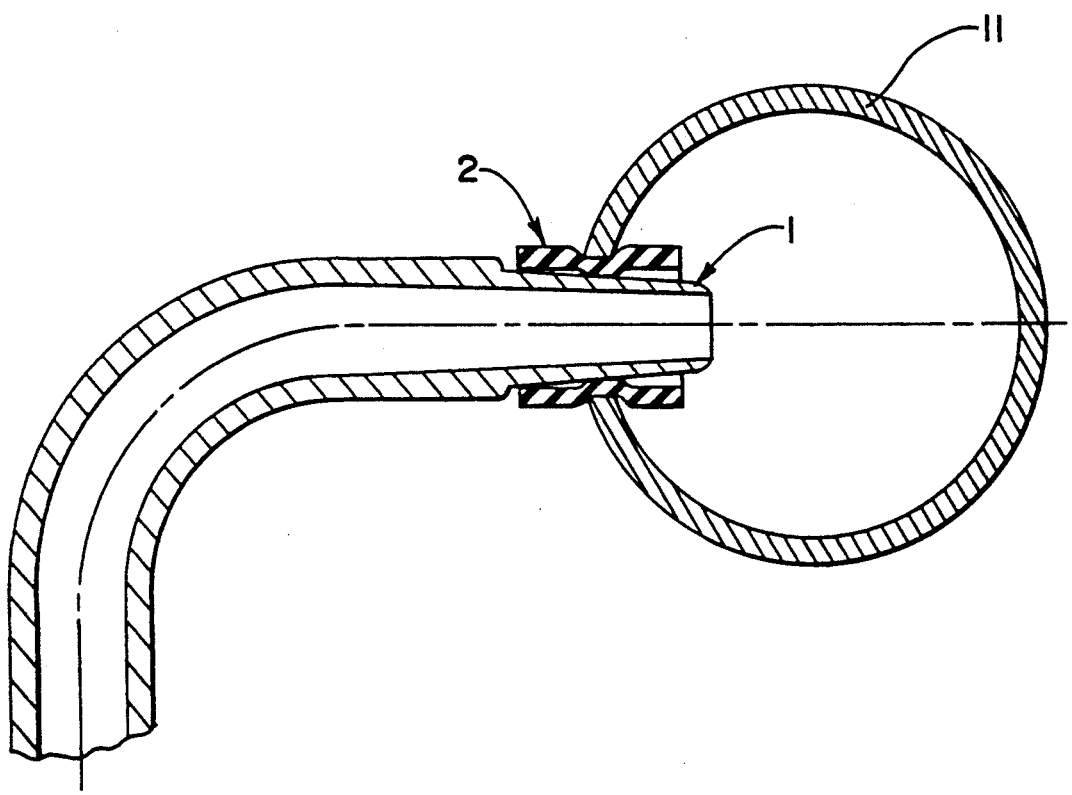
FIG. 2 illustrates the fitting in cross-section where the pipe is smaller than the bushing.

The various parts of the tight fitting consist in a truncated cone-shaped bushing 1 and in a flexible pipe 2.

The bushing 1 is a hollow part which has the external shape of a truncated cone, with an angle of conicity α between part 3 constituting the base of the cone and part 4 constituting the head of the bushing 1.

The hollow 5 inside the bushing has a cylindrical shape, as illustrated in the figure, or else a truncated cone shape.

The head 4 of the bushing is slightly tapered and rounded at its end 6.

The base 3 of the bushing comprises an annular extension constituting a flange 7 of which the front edge 8 is rounded.

The bushing 1 is for example in molded polyamide.

In one specific example of embodiment, the dimensions of the bushing were as follows: external diameter of the head 4, 13 mm, external diameter of the base, 14.5 mm, length L, 30 mm, which corresponds to an angle $\alpha$ of 3°, external diameter of the flange 7, 16.5 mm.

The pipe 2 is in soft rubber, of shore hardness A ranging between 70 and 80.

In said example, applying to a connection on a circular orifice whose bore reaches 18 mm, the external diameter of the pipe 2 was 18.5 mm, i.e. substantially 3% greater than that of the bore, with a thickness of 2 mm.

The two parts 1, 2 constituting the tight fitting according to the invention are used as follows.

The bushing 1 is introduced inside the pipe, the base 3 being introduced first; then said base is pushed so that the head 4 of the bushing is approximately 1 cm away from the front edge 9 of the pipe 1.

By pre-positioning the bushing 1 in this way inside the pipe 2, first there is a certain length of pipe extending beyond the bushing, and second, the head 4 of the bushing faces towards the free end of the pipe 2.

The next operation consists in introducing said length of pipe 2 extending beyond the bushing 1, into the orifice 10 defined by the wall 11.

On account of the fact that the external diameter of the pipe is slightly, larger than that of the bore of the orifice 10, the introduction is made by force.

Then, the bushing 1 is caused to slide inside the pipe 2 so that the head 4 of the bushing 1 penetrates into orifice 10. This sliding operation is continued until the bushing is completely wedged in, i.e. until the crushing in of the pipe 2 between the wall 11 of the orifice and the truncated cone-shaped face of the bushing 1 prevents said bushing from advancing.

The presence of the flange 7 increases the bearing surface which allows the sliding of the bushing 1. Its rounded edge 8 prevents any damage to the inner face of the pipe 2. The flange 7 can, if necessary, act as a locking stop.

In the illustrated example, the pipe 2 is extended, as shown on the left of the figure; in this case, the pipe 2 is fixed in the wall 11 of a liquid storage reservoir.

Obviously, other version are possible without departing from the scope of the present invention. The pipe 2 may be of shorter length and the bushing may be extended beyond its base 3, for example by an elbow piece, possibly equipped with a valve system, or else the pipe itself may have an elbow-shaped end.

The invention is not limited to the embodiments described hereinabove by way of example and non-restrictively and on the contrary covers all variants. In particular, it is left to the man skilled in the art to determine, as a function of the materials constituting the truncated cone-shaped bushing 1 and the pipe, the angle of conicity of the bushing so that said angle is always less than the angle of friction, i.e. less than the friction coefficient expressed in angular form, between said materials. This is imperative for the fitting to remain in place after mounting. Except in those cases where the bushing 1 is in a particularly slippery material, such as teflon, the angle of conicity will generally be 20° maximum.

What is claimed is:

1. Method of tight connection between a first fixed and rigid element provided with a circular orifice and a second element, said method comprising:
    a) introducing inside a pipe of flexible material, whose external diameter is slightly larger than the diameter of the orifice, a truncated cone-shaped bushing whose angle of conicity is less than an angle expressive of friction coefficient between the materials constituting the bushing and the pipe, respectively, such that a head of the truncated bushing is at a certain distance from one given end of the pipe;
    b) force-introducing said end of the pipe into the orifice; and
    c) causing the bushing to slide inside the pipe until the pipe is completely blocked between the bushing and the orifice.

2. Method as claimed in claim 1, further comprising connecting the second element which is an actual flexible pipe to the bushing.

3. Method as claimed in claim 1, wherein the flexible pipe has a length smaller than that of the bushing and the second element is connected to a base of the truncated bushing.

4. Tight connection fitting for a circular orifice in a fixed and rigid element, said fitting comprising:
    a) a pipe of flexible material whose external diameter is slightly greater than the diameter of the orifice, said pipe having one of its ends to be introduced into the orifice, and
    b) a truncated cone-shaped bushing whose angle of conicity is less than an angle expressive of friction coefficient between the materials constituting the bushing and the pipe, and whose diameter at its base is substantially equal to the internal diameter of the pipe, said base being opposite to said one end of the pipe when the bushing is introduced into the pipe.

5. Connection fitting as claimed in claim 4, wherein when the bushing is made of polyamide and the pipe is made of rubber, the angle of conicity of the bushing is at the most 20°, and preferably between 2° and 10°.

6. Connection fitting as claimed in claim 4, wherein the bushing is provided at the base with an annular flange.

7. Connection fitting as claimed in claim 4, wherein the pipe has an external diameter which is 2 to 4% greater than the diameter of the circular orifice of the element.

* * * * *